Dec. 1, 1970    L. W. HAAKER ET AL    3,543,592
SEALED WRIST JOINT

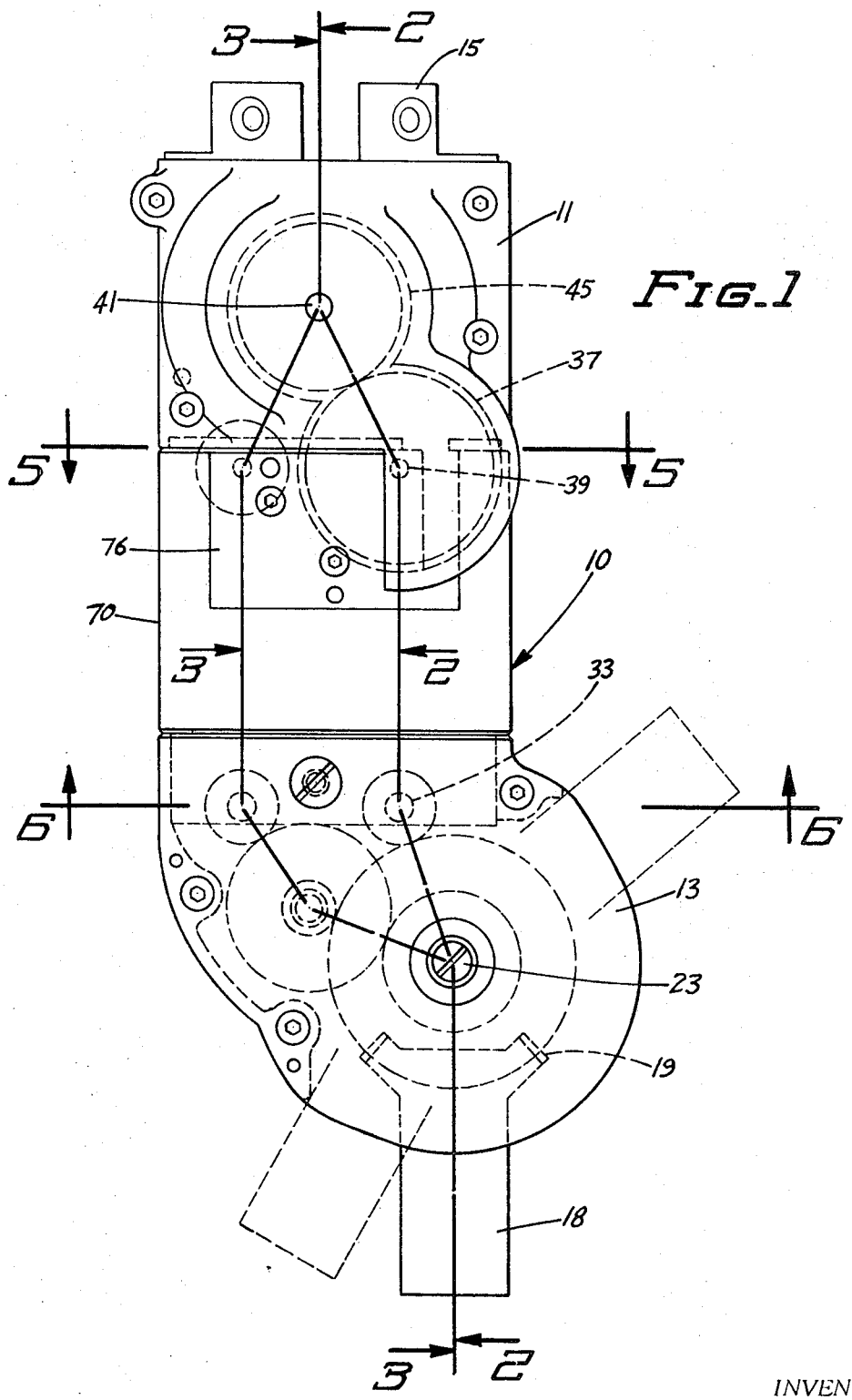

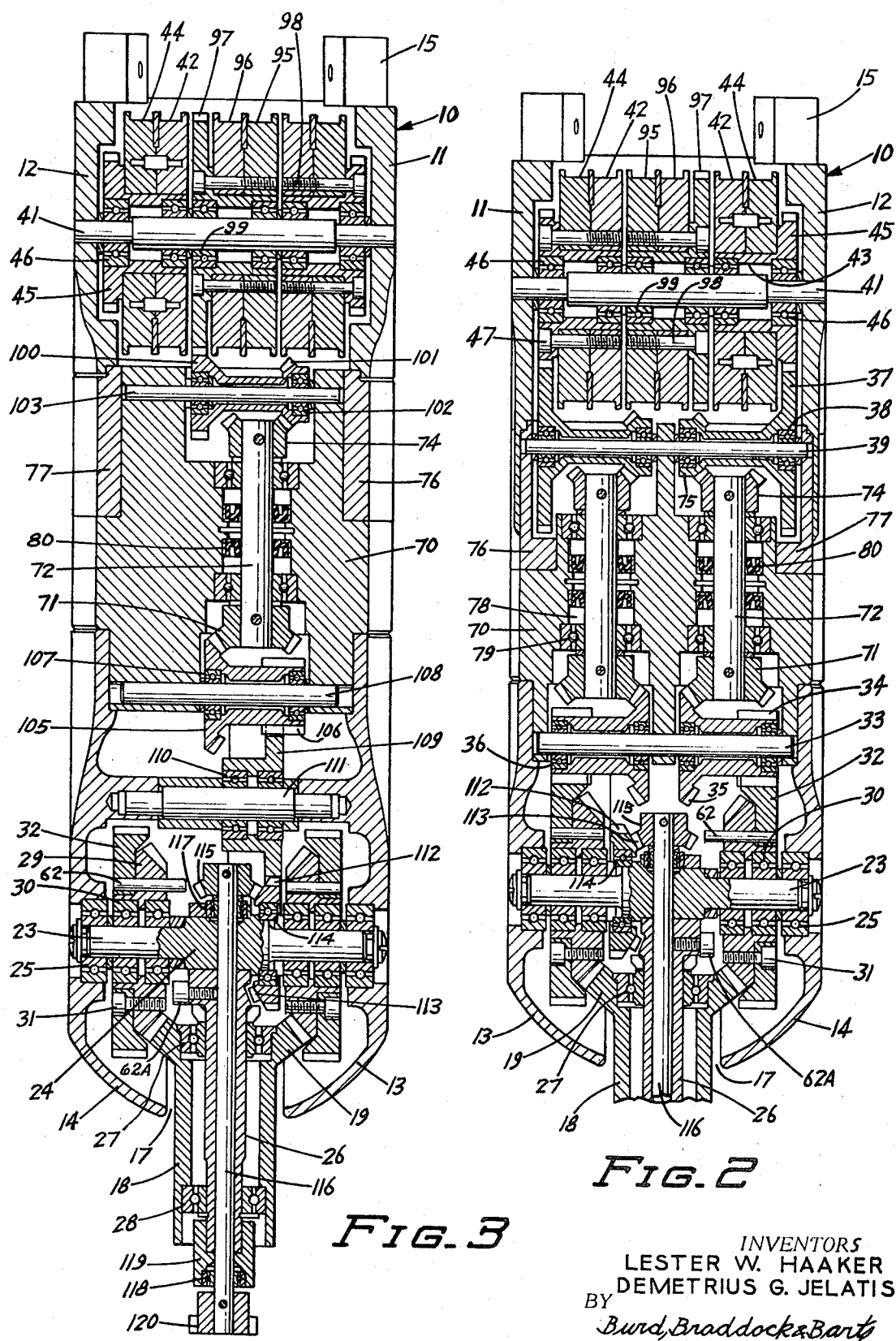

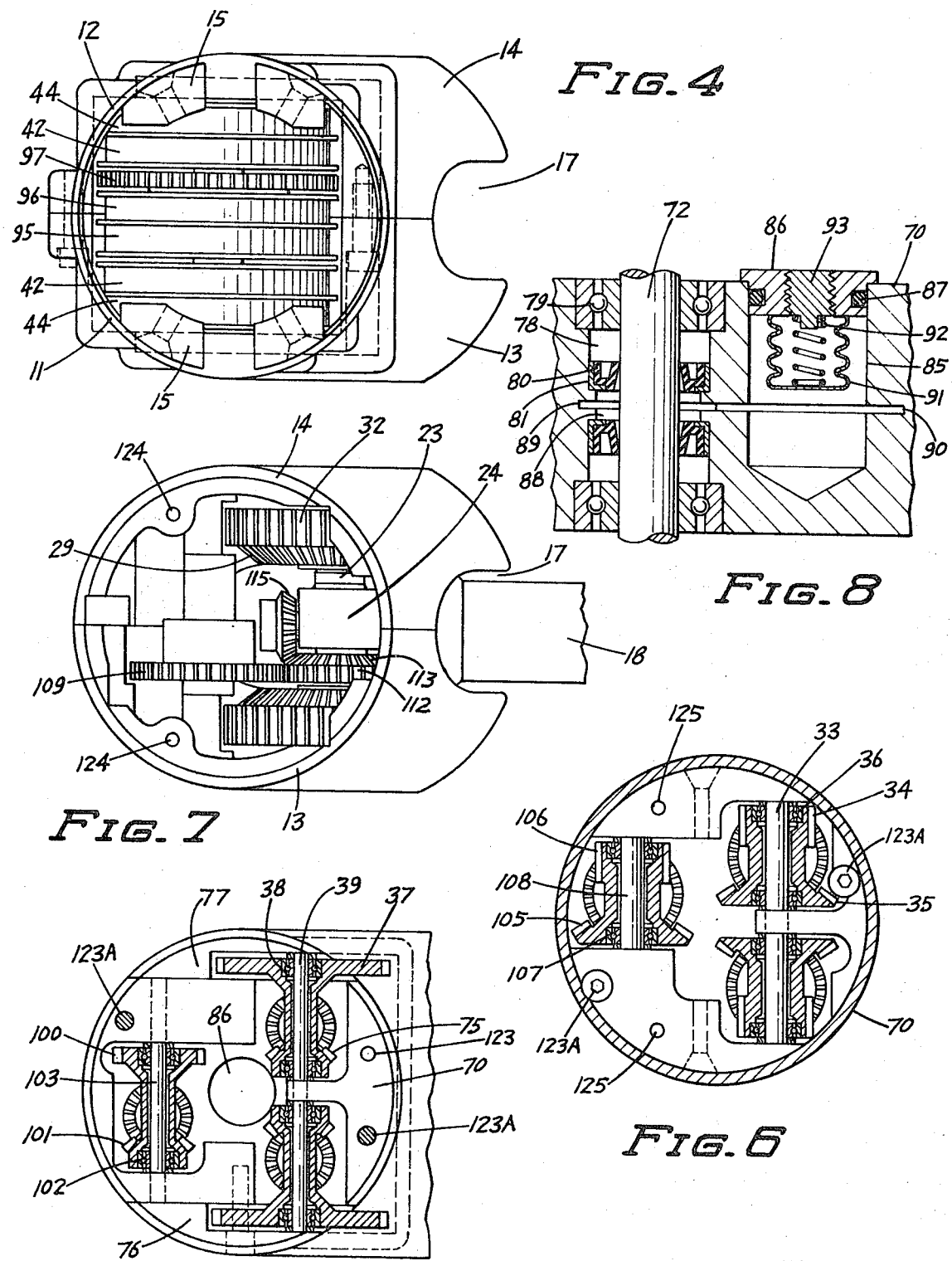

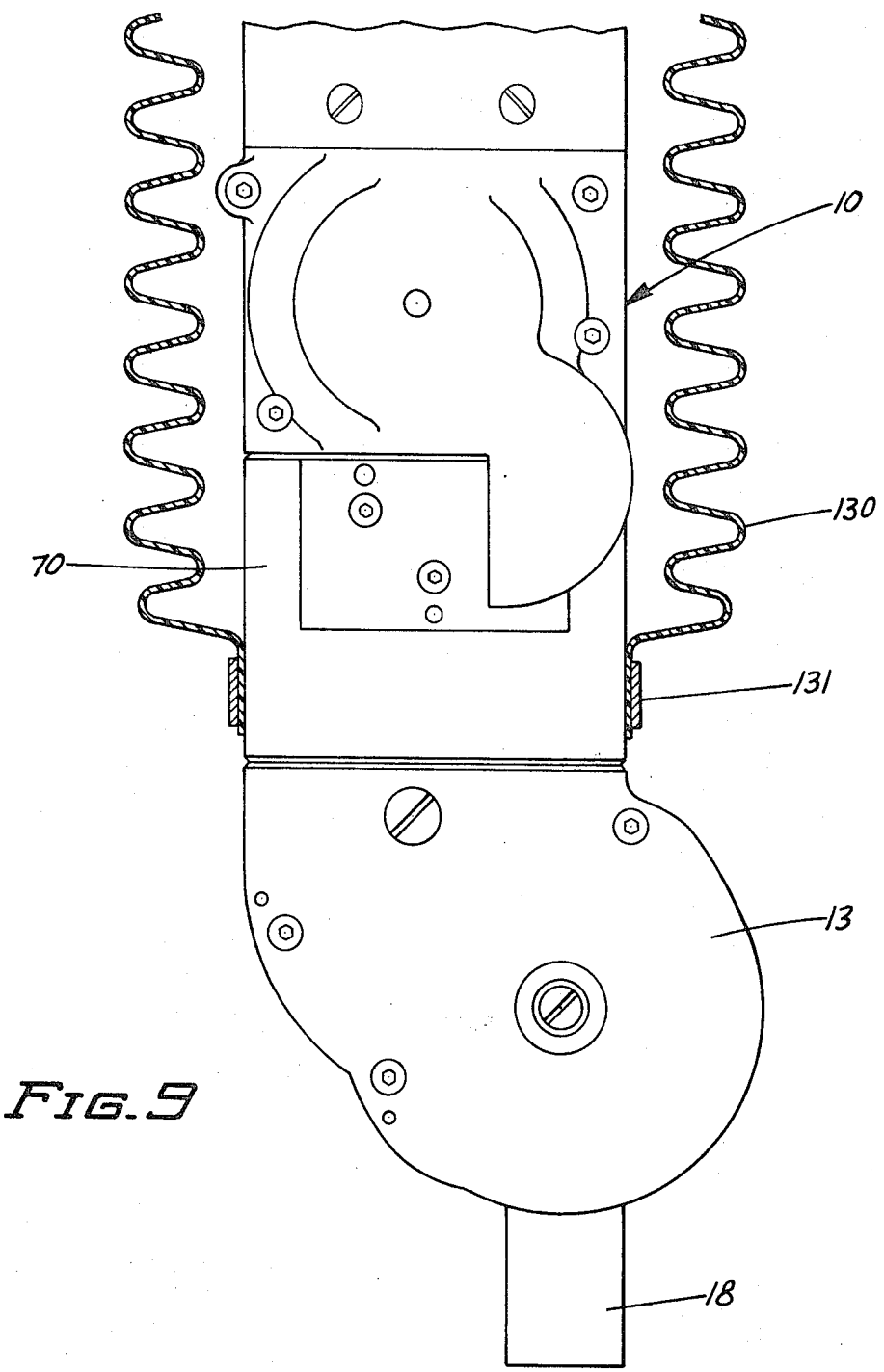

Filed April 8, 1969    5 Sheets-Sheet 5

INVENTORS
LESTER W. HAAKER
DEMETRIUS G. JELATIS
BY
Burd, Braddock & Bartz
ATTORNEYS United States Patent Office 3,543,592
Patented Dec. 1, 1970

3,543,592
SEALED WRIST JOINT
Lester W. Haaker and Demetrius G. Jelatis, Red Wing, Minn., assignors to Central Research Laboratories, Inc., Red Wing, Minn., a corporation of Minnesota
Continuation-in-part of application Ser. No. 774,467, Nov. 8, 1968. This application Apr. 8, 1969, Ser. No. 814,265
Int. Cl. F16h 1/06; B25j 3/00
U.S. Cl. 74—89.16                                12 Claims

ABSTRACT OF THE DISCLOSURE

A sealed wrist joint for mounting the tong means of a remote control master-slave manipulator. Elevation and twist and tong motions are transmitted from the master arm to tape drums and thence through rotary seals to differential gears and to the operating members of the tong assembly. A slave arm fitted with the wrist joint can be booted to provide more complete sealing with reduced motion interference.

This application is a continuation-in-part of our copending application Ser. No. 774,467 filed Nov. 8, 1968 entitled Wrist Joint.

This invention relates to a new and improved wrist joint for the slave arm of a remote control master-slave manipulator of the type which is used by an operator to perform certain manipulative functions in some area remote from the operator as, for example, on the opposite side of a shielding wall. Such manipulators are well known and widely used. One such manipulator, to which the wrist joint of the present invention is especially adapted, is illustrated and described in U.S. Pat. No. 2,771,199 issued on Nov. 20, 1956 to Demetrius G. Jelatis, one of the instant co-inventors.

Manipulators of this general type comprise a horizontal tubular support usually mounted in a sleeve or tube so as to extend through a generally vertical shielding wall and to be rotatable therein. A master arm is suspended from one end of the horizontal support on one side of the wall and a slave arm is suspended from the opposite end on the other side of the wall. Both master and slave arms include a relatively stationary portion which is attached to the horizontal support and rotates with it on its horizontal axis and a relatively movable portion which is movable longitudinally relative to the stationary portion. The relatively stationary portions are pivotally attached to the horizontal tubular suport and movable on those pivots, whereas the relatively movable parts are movable toward and away from those pivots.

A handle is supported from the lower end of the movable part of the master arm to be engaged by the hand of the operator and by appropriate motions transmitted along the master arm through the horizontal support and along the slave arm controls the movement of a tong means supported from the lower end of the movable part of the slave arm. The twist joint of the present invention provides the means by which the tong means are connected to the slave arm and function in response to motions transmitted from the handle.

It is common practice to partially seal and to protect the slave arm from excessive contamination by providing a "boot" over it extending from the slave cell end of the horizontal tubular support to the tong tips and enclosing the wrist joint. This boot is usually in the form of a loosely fitting corrugated tubular sleeve formed from synthetic resinous plastic material. Because the booting has heretofore been required to accommodate wrist twist and elevation motions as well as tong squeeze, it has tended to be bulky in the area of the wrist joint where it obscured to some extent the field of vision of the operator, restricted wrist motion and was susceptible to snagging and other damage.

The wrist joint of the present invention is vertically separable and has interposed between its members a double sealed rotary shaft system which allows simplification of the booting system with a boot terminating above the wrist-differential. Because the boot is, therefore, not required to accommodate wrist twist and elevation motions and also tong squeeze, it can provide more complete sealing with reduced motion interference. Because the boot is less bulky, it can help eliminate snagging of the boot due to unnoticed contact with sharp or hot objects and helps improve the visibility of the tong by the operator.

The invention is illustrated in the accompanying drawings in which:

FIG. 1 is a side elevation of the wrist joint assembly, showing three vertically separable sections;

FIG. 2 is a section on the line 2—2 of FIG. 1 and in the direction of the arrows;

FIG. 3 is a section on the line 3—3 of FIG. 1 and in the direction of the arrows;

FIG. 4 is a top plan of the wrist joint assembly;

FIG. 5 is a horizontal section of the top of the intermediate section of the wrist joint taken along the line 5—5 of FIG. 1;

FIG. 6 is a horizontal section looking upwardly at the bottom of the intermediate section taken along the line 6—6 of FIG. 1;

FIG. 7 is a top plan of the bottom section of the wrist joint;

FIG. 8 is an enlarged fragmentary vertical section showing an oil reservoir for the sealing system of the wrist joint;

FIG. 9 is an elevation partly in section showing one manner of attachment of a boot to the wrist joint according to the present invention.

Figure 10:
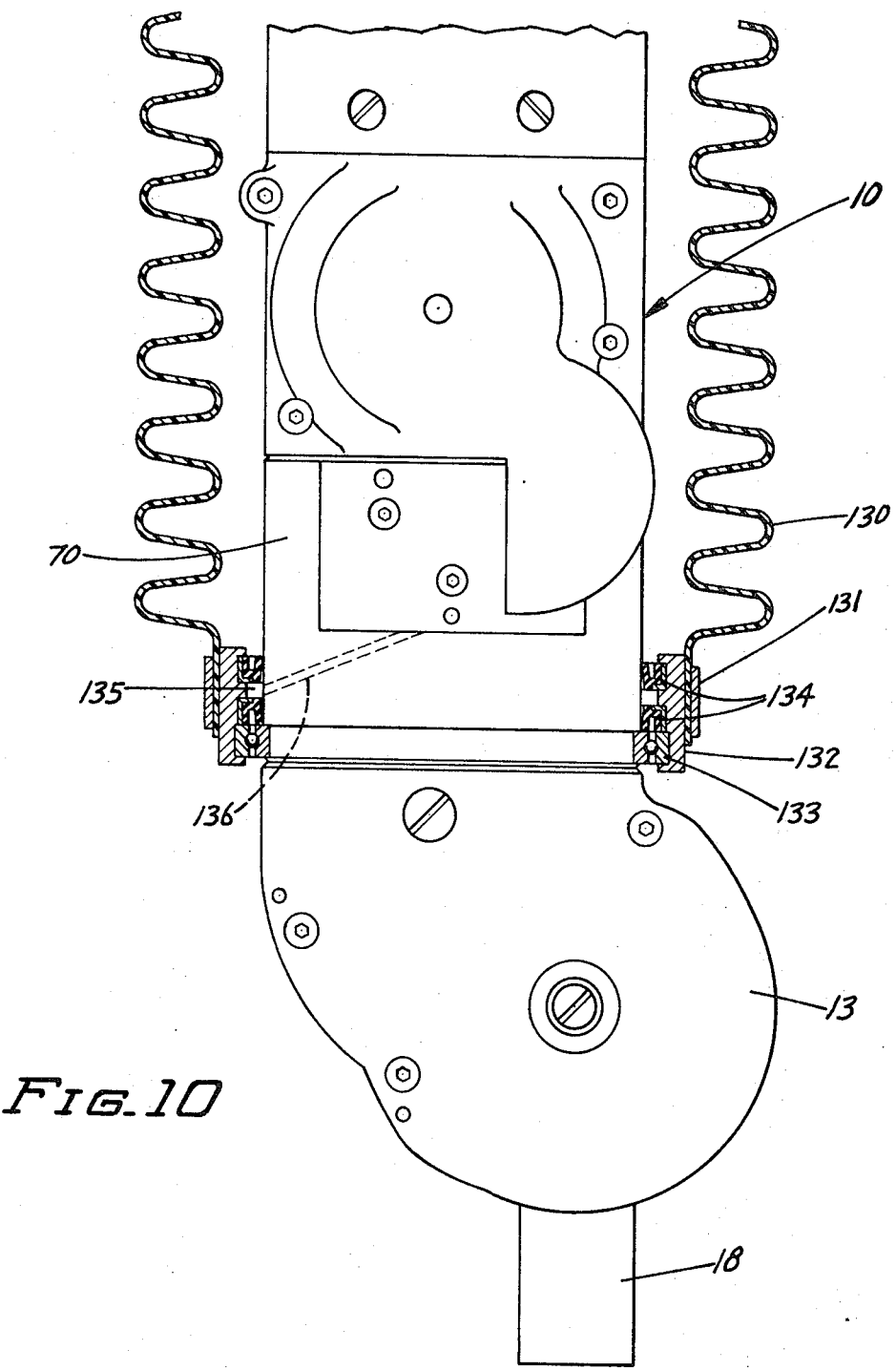
FIG. 10 is an elevation partly in section showing another manner of attachment of a boot to the wrist joint.

Referring now to the drawings, the wrist joint assembly as shown in elevation in FIG. 1 represents a right hand elevation from the operator's point of view of the wrist joint in normal at-rest position. Another wrist joint in the same relative position is employed on the master arm. The master arm wrist joint may be generally of the type of copending application Ser. No. 774,467 (now Pat. No. 3,503,273) or it may be any other type capable of transmitting handle motions, except that the tong drive must be of the type generally illustrated and described in our copending application Ser. No. 830,950 filed June 6, 1969 and entitled Rotary Tong Squeeze System. In virtually all instances the manipulators of which the wrist joints form a part are employed in spaced pairs so that the operator, by means of the use of two master control arms, is able to manipulate two slave arms in order to reproduce the action of a pair of hands in the remote area on the other side of the shielding wall. To the extent feasible, to facilitate comparison with the wrist joint of application Ser. No. 744,467, the same numbering system is employed.

The wrist joint assembly, indicated generally at 10, is enclosed in a housing whose upper portion is composed of a pair of complementary generally semi-cylindrical shell members 11 and 12 and whose lower portion is composed of a pair of complementary downwardly and forwardly extending hollow shell members 13 and 14. The upper and lower sections of the housing are connected through an intermediate middle sealing section 70 described in greater detail hereinafter. The top of the housing is open. Each of the upper housing members 11 and 12 is provided with a pair of upstanding arcuate ears 15 by means of which the wrist joint housing may be attached to the lower end of a slave arm boom tube and secured, as by means of screws. The remainder of the housing is closed except for a wide central slot 17 in the forward and downwardly extending surfaces of the lower housing portion to permit elevation movements of the handle and tong means to be transmitted by virtue of the tubular shank 18 of a bevel gear 19 which extends through that slot.

The trunnions 23 of yoke 24 are journaled in a pair of ball bearings 25 carried in the opposite side walls of the lower portion of the assembly housing. A hollow tubular shaft 26 extends from yoke 24 and carries a pair of ball bearings 27 and 28 by means of which the tubular shank 18 of bevel gear 19 is journaled for rotation about an axis perpendicular to the axis of rotation of the yoke trunnions. The tong means of the manipulator are carried by tubular shank 18. Bevel gear 19 meshes with a pair of bevel differential gears 29 which are journaled by means of two pairs of ball bearings 30 to rotate on trunnions 23 of yoke 24 and are secured, as by means of screws 31 to spur gears 32 for rotation together.

A stationary shaft 33, whose ends are supported in the opposite sides of the lower portion of the intermediate housing portion, carries a pair of two-part gears 34–35 which are journaled by means of two pairs of ball bearings 36. Spur gear sections 34 mesh with spur gears 32 secured to the differential bevel gears 29. Bevel gear sections 35 mesh with bevel gears 71 at the ends of sealed shafts 72 of rotary seals secured in middle housing section 70, as described in detail hereinafter. Bevel gears 74 at the opposite ends of shafts 72 mesh with the bevel gear sections 75 of a two-part gear 75–37, each journaled by means of a pair of bearings 38 carried by fixed shaft 39 supported in the opposite side walls of the upper portion of the intermediate housing section.

The two-part elevation and twist tape drums are carried by a stationary horizontal shaft 41 whose ends are supported in opposite side walls of the upper portion of the wrist joint assembly housing. Each drum is composed of an inner flanged drum segment 42 and an outer flanged drum segment 44 mounted on a hub 43 having an outwardly extending gear toothed extension 45 whose teeth mesh with the teeth of spur gear section 37 of two-part gear 75–37. The tape drum assembly is journaled for rotation about shaft 41 by means of pairs of bearing 46. Both drum segments are of the same diameter and are secured to the toothed extension 45 of hub 43, as by means of screws 47, to rotate together as a unit.

As is well understood in the art, the elevation and twist tapes, or similar linear motion transmission elements, extend in opposite directions in their respective grooves or channels of the composite tape drum so that, as the drum is rotated, one tape is being wound about the drum as the other is being unwound.

It will be noted that the upper section of the wrist joint assembly may be separated vertically. When the assembly is separated gears 45 are lifted out of engagement with gears 37. This permits easy removal of the boot as a sealed assembly with the intermediate section of the wrist joint.

Each of the composite tape drums rotates independently of the other. In use, the paired tape couplings are continuous from the master end of the manipulator to the composite drum at the slave end in such manner that, with the tapes under pretension, motion can be efficiently transferred between master and slave end drums without backlash. The drums are completely independent. They rotate in opposite directions at the same speed under pure twist rotation. They rotate in the same direction at equal speeds under pure elevation rotation. Under combined elevation and twist movements, they can rotate at any combination of speeds and directions. One drum pair can be held stationary and the other rotated to produce a combined elevation and twist movement.

Angular movement of the yoke 24 about the trunnions 23 is limited by means of the ends of the slot opening 17 in the wrist joint housing through which the shank of bevel gear 19 extends. Pin or peg 62 set in the differential gear 29–32 limits the movement of the differential gears in both directions by coming into engagement with screw 62A in the yoke body. This has the effect of limiting tape movements of the drums which are directly interconnected with the differential gears.

The generally cylindrical intermediate housing section 70 functions as a barrier wall interposed between the upper and lower housing sections and carries a plurality of rotary seals. The sealing section 70 is rigidly secured to the lower housing section, desirably in a half-lap butt joint, as shown. A pair of vertically extending arcuate side plates 76 and 77 are seated on shoulders on the upper surface on opposite sides of intermediate section 70. The ends of shaft 39 are carried in these side plates. The upper housing section is desirably fit with a half-lap butt joint rigidly secured to the top of the intermediate sealing section. The upper housing shells 11 and 12 are shaped and enlarged as necessary to envelop the rotary elements housed within, as best seen in FIG. 4. The forward lower portions of shells 11 and 12 enclosing gears 37 overlap the side plates 76 and 77, as best seen in FIG. 2.

The intermediate barrier section 70 is penetrated by a plurality of passages 78 through which shafts 72 extend. Each shaft 72 is supported by a pair of bearings 79 fit into the passages 78. Each shaft 72 is encircled by a pair of spaced apart resilient seal rings 80. As best seen in FIG. 8, each seal ring 80 is generally U-shaped in section. The inner portion of the ring engaging the shaft has an initial opening somewhat smaller than the shaft. Thus, the resiliency of the seal ring maintains constant sealing engagement with the shaft 72. Each seal ring 80 is contained in a flanged retainer ring 81 which fits tightly and seats on an internal shoulder in passage 78.

For added protection an oil reservoir 85 is desirably provided in the intermediate barrier section 70. The reservoir 85 is closed by a plug 86 which is preferably threaded and fitted with a sealing O-ring 87. The chambers 88 between the seal rings 80 are connected with the reservoir through interconnecting annular chambers 89 and 90. The oil in reservoir 85 is desirably maintained under light constant positive pressure as by means of bellows 91 spring loaded by coil spring 92 inserted into the bellows through an opening in reservoir plug 86 and in turn retained by means of a threaded plug 93. A sudden increase in pressure on either side of the pair of seal rings will tend to exert pressure on the inside of the opposite sides of the seal ring urging the sealing surface into even tighter sealing engagement with the shaft 72.

The sealed slave wrist joint as shown embodies a novel rotary tong squeeze system which per se is the subject of our aforesaid copending application Ser. No. 830,950 directed to Rotary Tong Squeeze System. A two-part tong squeeze tape drum composed of flanged drum segments 95 and 96 and gear 97 are secured together as by means of screws 98 and mounted for rotation on fixed shaft 41 by means of a pair of bearings 99. This drum is adapted to receive tape wound in opposite directions around the drum, as already described in conection with the elevation and twist motions.

As best seen in FIG. 3, gear 97 engages and meshes with the spur gear portion 100 of a two-part gear including bevel gear section 101. The two-part gear 100–101 is mounted for rotation by means of a pair of bearings 102 on fixed shaft 103 carried in the upper portions of intermediate housing barrier section 70. Bevel gear portion 101 in turn engages a bevel gear 74 carried by end of one of shafts 72 extending through the intermediate barrier wall section 70 and comprising part of a rotary seal which is in all respects as already described. Bevel gear 71 at the opposite end of shaft 72 on the opposite side of the double seal in turn engages a two-part gear composed of bevel gear section 105 and a spur gear section 106. Composite gear 105–106 is mounted by means of a pair of bearings 107 to rotate on fixed shaft 108 carried in the bottom portion of barrier wall section 70.

Gear section 106 engages gear 109 mounted for rotation by means of a pair of bearings 110 on stationary shaft 111 carried by the bottom housing portions 13 and 14. Gear 109 engages and meshes with the spur gear portion 112 of a composite gear having a bevel gear portion 113. Composite differential gear 112–113 is mounted by means of bearing 114 to rotate about trunnion 23 of yoke 24. The bevel gear portion 113 engages and meshes with a bevel gear 115 which is fixed to one end of a rotary shaft 116 extending through the yoke and hollow tubular shaft 26. One end of shaft 116 is journaled in bearing 117 in yoke 24 and the opposite end is journaled in bearing 118 in collar 119 secured to the end of hollow shaft 26. The opposite end of shaft 116 carries gear 120 for transmission of tong squeeze and tong opening motions to the tong means (not shown) from the handle at the end of the master arm.

As seen from the drawings, the upper and lower and intermediate barrier sections of the housing fit together in partially telescoping joints to form a compact rigid structure secured together, as by screws, in the conventional manner. Vertical hole 123 is provided in the upper surface of intermediate barrier housing section 70 for the insertion of a locating pin. A corresponding hole (not shown) is provided in the bottom surface of the upper housing section to insure proper orientation of the elements within the housing. Similarly holes 124 are provided in the top of the bottom housing section for insertion of locating pins which fit into corresponding holes 125 in the bottom surface of the middle section 70 for orientation of the mechanisms of these sections. Fasteners 123A which are gasketed to the intermediate section 70 secure the intermediate section to the upper section.

It will be seen that by means of the wrist joint of the present invention elevation and twist and tong squeeze motions are transmitted from the master arm of the manipulator through suitable linear motion transmission means, such as tapes, to the drums located in the top of the wrist joint housing. The resulting rotary motion of the drums is transmitted through the rotary seals to the operating differential gearing in the bottom of the wrist join housing. The passages through the wrist joint housing, heretofore inherently present between the various operating elements of the assembly, have been effectively eliminated.

In FIG. 9, there is shown one method by which the corrugated tubular boot 130 is secured to the intermediate section 70 of the wrist joint assembly. Band clamp 131 extends around and engages the bottommost end of the boot 130 and holds it in tight gripping relationship with the lowermost end of the intermediate section 70 of the wrist joint.

The boot secured, as shown in FIG. 9, moves at all times with the wrist joint assembly being rigidly attached thereto. Under some conditions, this rigid attachment of the boot may inhibit azimuth rotation of the slave arm. To avoid this, there is shown an alternative method of sealably attaching the boot to the intermediate portion of the wrist joint assembly in FIG. 10. According to the embodiment of FIG. 10, the bottommost end of the boot 130 is secured by means of a band boot clamp 131 to a rigid ring 132 mounted on the lowermost edge of intermediate section 70 of the wrist joint assembly by means of bearing 133 so as to permit relative rotation of the wrist joint within the ring. This in turn permits relative rotation of the slave arm boom tube assembly within the boot.

A pair of spaced apart resilient seal rings 134 are mounted on the inside surface of the boot mounting ring 132. The inner portion of each seal ring 134 has an opening somewhat smaller than the outer diameter of the intermediate wrist joint section 70 so as to resiliently engage the same to maintain a constant sealing relationship while permitting relative rotation of the wrist joint within the boot mounting ring. The annular chamber 135 is desirably in communication with oil reservoir 85 within the wrist joint intermediate section through a passage 136.

The embodiments of the invention in which an exclusive property and privilege is claimed are defined as follows:

1. A sealed wrist joint for a remote control master-slave manipulator comprising:
   (A) a housing including upper and lower portions and an intermediate barrier wall portion disposed therebetween;
   (B) a plurality of take-up means for linear motion transmission elements journaled to rotate within the upper portion of said housing, each of said take-up means being rotatable independently and each having a pair of circumferential channels for receiving linear motion transmission elements wrapped in opposite directions;
   (C) gear means secured to each of said take-up means;
   (D) means including a plurality of spur gears journaled in the lower portion of said housing;
   (E) a plurality of rotary seals extending through said barrier wall;
   (F) means operatively connecting one end of said rotary seals with the gears of said take-up means;
   (G) further means operatively connecting the other end of said rotary seals with said spur gears;
   (H) means operatively connecting said spur gears to work performing means carried by the lower portion of the wrist joint; and
   (I) means for securing the portions of said housing together whereby the housing portions and mechanisms contained therein are separable.

2. A manipulator wrist joint according to claim 1 further characterized in that each of said rotary seals comprises:
   (A) a shaft extending through a passage through said barrier wall and journaled therein for rotation;
   (B) annular sealing means within said passage embracing said shaft in sealing engagement therewith; and
   (C) gears secured to opposite ends of said shafts on opposite sides of said sealing means.

3. A manipulator wrist joint according to claim 2 further characterized in that:
   (A) said sealing means comprises at least one spaced apart pair of resilient sealing rings;
   (B) oil reservoir means are provided in said intermediate housing portions; and
   (C) channel means connect said oil reservoir means with the chamber between any adjacent pair of sealing rings.

4. A manipulator wrist joint according to claim 3 further characterized in that:
   (A) said gear means of the take-up means are spur gears;
   (B) said gears secured to the shafts of the rotary seals are bevel gears; and
   (C) said means operatively connecting the ends of the rotary seals with the gears of the take-up means and the spur gears journaled in the lower portion of the housing include composite two-part gears each including one spur gear portion and one bevel gear portion.

5. A manipulator wrist joint according to claim 1 further characterized in that:
   (A) said work performing means includes tong means;
   (B) one of said take-up means receives linear motion transmission means controlling tong operation; and
   (C) said tong means is operatively connected to the one of said spur gears which is operatively connected to the take-up means for controlling tong operation.

6. A sealed wrist joint for the slave arm of a remote control master-slave manipulator comprising:

(A) a housing including separate upper and lower portions and an intermediate barrier wall portion disposed therebetween;

(B) a plurality of take-up means for linear motion transmission elements journaled to rotate within the upper portion of said housing, each of said take-up means being rotatable independently and each having a pair of circumferential channels for receiving linear motion transmission elements wrapped in opposite directions;

(C) gear means secured to each of said take-up means;

(D) a plurality of rotary seals extending through said barrier wall;

(E) means operatively connecting one end of each of said rotary seals to the gears of one of said take-up means;

(F) a yoke journaled for limited pivotal movement in the lower portion of said housing;

(G) a plurality of spur gears journaled on the trunions of said yoke;

(H) means operatively connecting the other end of each of said rotary seals to one of said spur gears;

(I) a plurality of differential bevel gears journaled to rotate with said spur gears;

(J) means operatively connecting said bevel gears to work performing means carried by the lower portion of the wrist joint; and (K) means for securing the portions of said housing together whereby the housing portions and mechanisms contained therein are separable.

7. A manipulator wrist joint according to claim 6 further characterized in that each of said rotary seals comprises:

(A) a shaft extending through a passage through said barrier wall and journaled therein for rotation;

(B) annular sealing means within said passage embracing said shaft in sealing engagement therewith; and (C) gears secured to opposite ends of said shafts on opposite sides of said sealing means.

8. A manipulator wrist joint according to claim 7 further characterized in that:

(A) said sealing means comprises at least one spaced apart pair of resilient sealing rings;

(B) oil reservoir means are provided in said intermediate housing portions; and (C) channel means connect said oil reservoir means with the chamber between any adjacent pair of sealing rings.

9. A manipulator wrist joint according to claim 8 further characterized in that:

(A) said gear means of the take-up means are spur gears;

(B) said gears secured to the shafts of the rotary seals are level gears; and (C) said work performing means includes tong means the rotary seals with the gears of the take-up means and the spur gears journaled on the trunnions of the yoke include composite two-part gears each including one spur gear portion and one bevel gear portion.

10. A manipulator wrist joint according to claim 6 further characterized in that:

(A) a bevel gear is supported from said yoke and journaled for rotation about an axis perpendicular to the axis of rotation of said differential bevel gears, the teeth thereof engaging the teeth of one pair of said differential gears;

(B) said bevel gear has an elongated shank extending through a slot in the lower portion of said housing;

(C) said work performing means includes tong means supported from the shank of said bevel gear;

(D) one of said take-up means receives linear motion transmission means controlling tong operation;

(E) a drive shaft extends through and is journaled for rotation within said bevel gear on the axis of rotation thereof;

(F) one end of said drive shaft is operatively connected to drive said tong means; and (G) the other end of said drive shaft is operatively connected to be driven from the one of said differential bevel gears operatively connected to the take-up means for controlling tong operation.

11. A manipulator wrist joint according to claim 1 further characterized in that the end of a tubular corrugated protective boot is secured to the intermediate barrier wall portion of the housing in sealing engagement therewith.

12. A manipulator wrist joint according to claim 11 further characterized in that:

(A) said boot is rigidly secured ot a ring extending around the intermediate barrier wall portion of the housing and journaled for rotation relative thereto, and (B) at least one annular sealing means is disposed in the space between said ring and barrier wall portion in sealing engagement therewith.

References Cited

UNITED STATES PATENTS 3,111,230  11/1963  Pesenti _____ 214—1
3,315,542  4/1967  Fortin et al. _____ 74—665

FRED C. MATTERN, JR., Primary Examiner

W. S. RATLIFF, JR., Assistant Examiner

U.S. Cl. X.R.

74—606, 665; 214—1

PO-1050
(5/69)

UNITED STATES PATENT OFFICE
CERTIFICATE OF CORRECTION

Patent No. 3,543,592      Dated December 1, 1970

Inventor(s) Lester W. Haaker and Demetrius G. Jelatis

It is certified that error appears in the above-identified patent and that said Letters Patent are hereby corrected as shown below:

Column 1, line 27, ", now Patent No. 3,503,273 issued March 31, 1970." is omitted.

Column 1, line 60, "twist" should be --wrist--.

Column 2, line 25, first "of" should be --at--.

Column 5, line 43, "join" should be --joint--.

Column 8, line 1, "(C) said work performing means includes tong means" should be --(C) said means operatively connecting the ends of--.

Column 8, line 37, "ot" should be --to--.

SIGNED AND
SEALED
MAR 2 1971

(SEAL)
Attest:

Edward M. Fletcher, Jr.
Attesting Officer

WILLIAM E. SCHUYLER, JR
Commissioner of Patents